C. A. BECKER.
SPECIFIC GRAVITY SCALE.
APPLICATION FILED DEC. 11, 1917.
1,272,605.  Patented July 16, 1918.
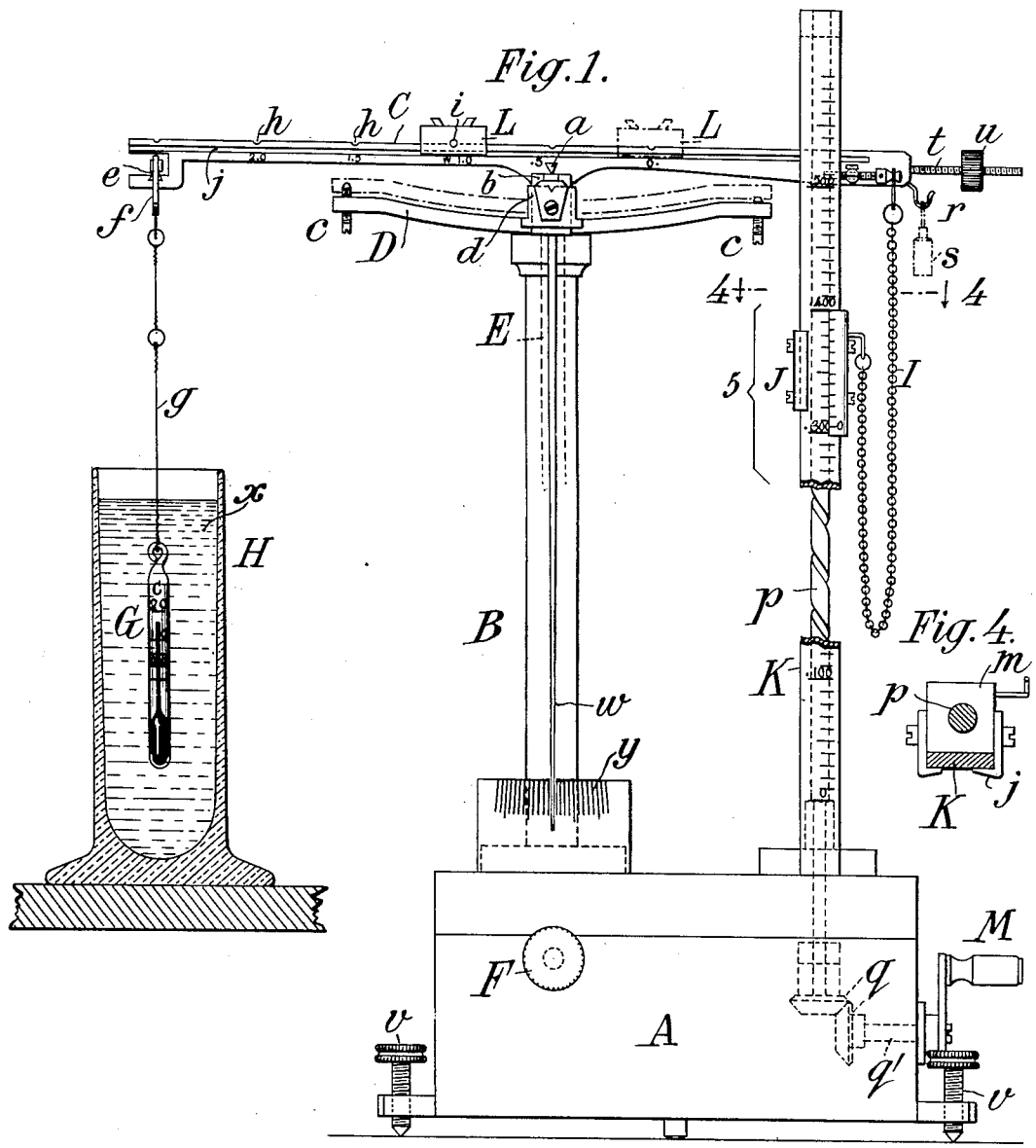
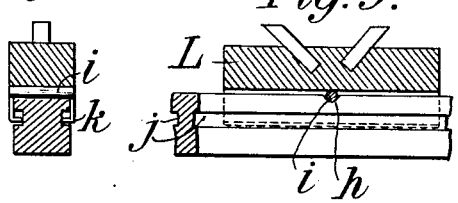
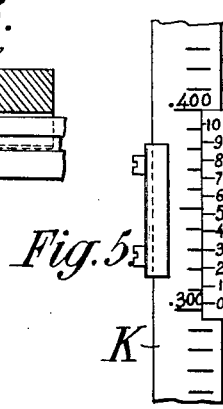
WITNESSES:
René Spuine
Harry M. Brand
INVENTOR:
Christopher A. Becker,
By Attorneys,
Fraser, Jurk & Myers

UNITED STATES PATENT OFFICE.

CHRISTOPHER A. BECKER, OF WEST NUTLEY, NEW JERSEY, ASSIGNOR TO THE TORSION BALANCE COMPANY, OF NEW YORK, N. Y., A CORPORATION OF NEW YORK.

SPECIFIC-GRAVITY SCALE.

1,272,605.    Specification of Letters Patent.    Patented July 16, 1918.

Application filed December 11, 1917. Serial No. 206,621.

*To all whom it may concern:*

Be it known that I, CHRISTOPHER A. BECKER, a citizen of the United States of America, residing in West Nutley, in the county of Essex and State of New Jersey, have invented certain new and useful Improvements in Specific-Gravity Scales, of which the following is a specification.

This invention aims to produce a scale or balance for determining the specific gravity of liquids by direct reading; to this end it utilizes a weighing chain hung at one end from the scale beam of the balance, and at the other or dead end from a slide adjustable up or down on a graduated support resembling in general the construction set forth in my Patent No. 1,203,686, dated November 7, 1916.

In weighing for specific gravities it is customary to either provide a receptacle which will hold a measured volume of liquid under test, and, allowing for the tare of the vessel, to determine the weight of such volume; or, preferably, to displace a certain volume of liquid by immersing therein a solid of the required displacement (commonly called a plummet), and to determine the weight of this plummet, whereby to ascertain the weight of the displaced liquid. According to either method the liquid under test is brought to a certain standard temperature (15° C.). By the latter method it is customary to construct the plummet as a thermometer for conveniently determining the temperature.

According to the present invention, the plummet is hung from one end of the scale beam, which is delicately fulcrumed upon knife edges or otherwise; a counterpoise (preferably a slide-weight) is movable to certain definitely located points along said beam, as by forming the beam with notches into which the poise enters; and the weighing chain is hung on the beam, preferably on the opposite arm thereof from the plummet. The vertically-movable slide to which the dead end of the chain is hung moves along a graduated bar or scale having a range of graduations equal to the interval between successive positions of the counterpoise on the beam. Thus, if the weight of the plummet when displaced by the liquid is such that the counterpoise, to balance it, would come between two notches or definite points on the beam, the counterpoise, instead of being brought to such intermediate poising position, will be located at either of the definite points or notches, and the slide will be raised or lowered to bring more or less of the weight of the chain upon the beam, and thereby to accurately weigh the fractional part of the weight corresponding to such assumed intermediate position of the counterpoise. Hence, the operator after bringing the scale to poise has only to add together the readings from the counterpoise notch and from the slide to get the precise fractional indication of the specific gravity.

In practice the most convenient arrangement is to make the definite counterpoised positions correspond to specific gravites of .5; 1.0; 1.5; 2.0; etc.; and to graduate the upright scale to cover the range between .0 and .500 (being the interval between any two successive counterpoise positions). By this means the specific gravity can readily be read to two decimal points, and for reading it to the third decimal point the slide is provided with a vernier scale.

The preferred embodiment of the invention is shown in the accompanying drawings, in which—

Figure 1 is a front elevation of the scale or balance, partly broken away in vertical section;

Figs. 2 and 3 are respectively cross-sections and longitudinal-sections of the scale beam and sliding counterpoise, on a larger scale;

Fig. 4 is a cross-section on the line 4—4 in Fig. 1, on the same scale as Figs. 2 and 3;

Fig. 5 is a fragmentary front view showing the upright graduated scale and vernier;

Fig. 6 shows a detachable counterweight removed.

According to Fig. 1, the scale or balance shown has a base or box A on which is mounted a supporting pillar B which affords the usual fulcrum support for the scale beam or balance beam C. This beam is shown as provided with a knife-edge $a$ adapted to rest, during weighing, on a fulcrum block $b$. For holding the beam rigidly in place, except during the weighing operation, there is provided the usual crosshead D having lifting screws $c$ $c$ at opposite ends and moved up or down by an upright rod E (shown in dotted lines) passing through the tubular standard B and raised or lowered by turning a thumb-wheel F at the front of the base A, all in the usual and well known manner. The middle of the crosshead D carries a block $d$ having notches which engage and slightly lift the knife-edges $a$ when the balance is in the inoperative or non-weighing position.

From one end of the beam C is hung, on knife-edges $e$ or otherwise, a pendent support $f$ for the plummet G, which is hung from $f$ by a very fine wire $g$, all in the well-known manner. The plummet G is preferably constructed, as usual, as a thermometer, and in use is immersed to a certain depth on the wire $g$ in the liquid the specific gravity of which is to be determined, which liquid is shown at $x$ being held in a beaker H. The weighing chain I is hung preferably from the opposite arm of the beam C. Its mode of connection to the beam and to the slide J, and the construction of this slide and of the upright bar or slide-weight K, are or may be as set forth in my aforesaid patent.

A counterpoise L is adjustable along the beam C, so that it may be hung on the beam at certain fixed points or locations. While it might be a hanging weight hung from notches in the beam, it is preferably a slider which when slid along the beam is stopped at any one of the locating points. These are best made as notches $h$ $h$ which are entered by a projection $i$ on the slider. Preferably, to guide and retain the slider the beam is formed with opposite grooves $j$ (Figs. 2 and 3), and the slider has inturned flanges $k$ entering these grooves; and the projection $i$ is formed by a short piece of hard steel wire passing through the slider from side to side and projecting from its bottom into any of the notches $h$. The construction is such that the slider has a slight lifting movement on the beam sufficient to enable its projection $i$ to ride out of the notches and run along the beam.

The notches $h$ $h$ are spaced apart at distances such, proportional to the weight of L and the displacement of G, that they will correspond to definite major specific gravity readings, as, for example, 0.500, 1.000, 1.500, etc., as shown. The weight of the chain I proportional to its ratio of leverage where hung from the beam, and to the traverse of the slide J, is such that for a given rising or falling movement of the slide the chain weight thus added to or taken from the scale beam corresponds to the difference in specific gravity between the successive notches $h$ $h$. In the example shown, the difference between these notched positions corresponds to 0.500 specific gravity, and the effective weight of the chain I, corresponding to the upper and lower positions of the slide J, covers the same range of 0.500 specific gravity. The upright graduated bar or scale K is marked with graduations from zero at the lowest position of J (where the maximum weight of the chain I is hung from the beam), to .500 at the highest position of J (where the minimum weight of the chain hangs from the beam).

The slide J is raised or lowered by the same means set forth in my aforesaid patent, that is to say, by being formed with a nut $m$ engaging a quick thread in a screw rod $p$ located back of the upright bar K, this rod being mounted in bearings so as to turn, and connected through miter gears $q$ with a horizontal shaft $q'$ carrying an operating handle M at the side of the base A.

The scale beam is provided with a hook $r$ (Fig. 1) on which may be hung a counterweight $s$ (Fig. 6), the weight of which is such as to counterbalance the plummet G when hanging in air. This counterweight $s$ is used only for the preliminary adjustment of the scale or balance. For effecting such adjustment the beam has a screw-threaded extension $t$ on which screws an adjusting weight $u$.

To prepare the scale or balance for specific gravity weighing it has first to be leveled, for which purpose any suitable indicator such as a plumb bob or spirit level (not shown) is provided, as usual, and leveling screws $v$ $v$ are provided. After the scale has been thus leveled, the plummet G is to be hung in place (the fixation crosshead D being first elevated to the dotted line position) and the compensating weight $s$ is hung on the hook $r$ (see dotted lines in Fig. 1). The counterpoise L is placed at 0.5 on the beam C. The slide J is run down to bring it to exactly zero on the scale K. At this time the vessel H is removed or is emptied of liquid, so that the plummet G hangs in air. The operator then, by turning the knob F, lowers the crosshead D; if the balance is correctly adjusted the beam C will be in perfect poise, as indicated by the usual pointer $w$ which should stand at the center or zero position on the indicating scale $y$. If, however, the balance is out of adjustment, the adjusting weight $u$ is to be screwed out or in until the pointer $w$ stands at zero. Then, on raising the crosshead D and removing the weight $s$, the balance is ready for weighing to determine the specific gravity of any liquid. Such liquid is poured into the vessel H until its level stands at an indicated point on the wire $g$ (as shown). The operator, knowing usually the approximate specific gravity of the liquid, sets the counterpoise L into such notch on the beam C that it will indicate the next definite specific gravity below that of the liquid. He will then lower the crosshead D, whereupon ordinarily the beam will be found to be out of poise. Then, by turning the handle M, he will run the slide J up or down until the beam is brought to poise (as shown by pointer $w$). He then adds to the specific gravity indicated at the notch beneath the counterpoise L, that indicated on the scale K.

For example, suppose the liquid to be weighed is somewhat lighter than water. The operator will set the poise L at .500 and will run the slide J up or down until the beam reaches poise; suppose the zero mark on slide J stands at .350 on the scale K. The operator mentally adds .500 and .350 and finds the specific gravity to be .850.

Or, if the liquid is heavier than water, the operator will, for example, set the sliding poise to notch 1.500, and on running the slide J up or down until the beam is brought to poise he may find that it stands at, for example, .120 on the upright scale. Adding these, he finds that the specific gravity of the liquid is 1.620.

For reading beyond two decimal points on the scale K the slide J is formed with vernier graduations, as best shown in Fig. 5. By noting the graduations at which the verniers coincide, the third decimal figure is determined, as, for example, the position shown in Fig. 5 indicates 0.303.

The construction could be modified by rearranging the parts with any corresponding change in the graduations. The invention is not limited to hanging the weighing chain from either arm of the scale beam. Nor is it limited to the use of a plummet, as shown, since in specific gravity work the weighing of a measured volume of liquid affords a well understood equivalent. In any case, the graduations are to be arranged so as to correspond with the requirements, as is well understood by experts in specific gravity weighing. Any such modifications which are within the knowledge and skill of the art may be made without affecting the invention.

This specific gravity scale has the important advantages that it affords the utmost accuracy in weighing, and the specific gravity is ascertained much more quickly and conveniently than with any previously known specific gravity scale. Heretofore it has been necessary to adjust usually two, three or more weights or counterpoises by hanging them upon the balance beam at different points, and then to add together the weight indications corresponding to the weights and positions of the respective counterweights. In bringing the beam to exact poise it has been necessary to hang the last or finest weight often in several different positions before the precise poise was attained. This delicate and painstaking work is avoided in my new scale by the application of the weighing chain, which lends itself to an extremely minute change in the counterweight hung on the beam by the single manipulation of the one handle M. When a poise has thus been reached the result is immediately read off from the upright scale graduations.

I claim as my invention:—

1. In a specific gravity scale, a beam, a plummet suspended from one arm thereof, a counterpoise movable on the beam to definite locating points thereon, a weighing chain hung to the beam at one end, a movable support to which the other end of the chain is hung, and by which it is vertically adjustable and a graduated part indicating the movement of said support, the graduations thereon covering a total range corresponding to the range between successive positions of said counterpoise.

2. The specific gravity scale of claim 1, said support being a vertically-movable slide, with a vertical guide for said slide, the graduations being on the slide and guide respectively.

3. The specific gravity scale of claim 1, combined with a weight adapted to be hung on the beam at a point opposed to the plummet, and to counterbalance the latter, to enable the scale to be adjusted before weighing.

4. The specific gravity scale of claim 1, the beam formed with longitudinal grooves, and the counterpoise formed as a slider having projections engaging said grooves, to hold the slider in engagement with the beam.

5. In a scale, the combination of a beam having longitudinal grooves and having successive locating notches, and a counterpoise formed as a slide having means for engaging said notches and having projections engaging said grooves, to hold the slide in engagement with the beam, the engagement between the slide and beam having sufficient play in vertical direction to permit the slide to be lifted from such notches.

In witness whereof I have hereunto signed my name.

CHRISTOPHER A. BECKER.